8386X

G. Tiemann,

Scarificator.

Patented Aug. 26, 1834

AM. PHOTO-LITHO. CO. N.Y. (OSBORNE'S PROCESS.)

George Tiemann City of New York.
Letters Patent

The Schedule referred to in these Letters Patent and making part of the same containing a description in the words of the said George Tiemann himself of his improvement in the surgical instrument called the scarificator.

To all to whom these presents shall come -

Be it known that I George Tiemann, of the City and County, and State of New York, have invented a new and useful improvement in the surgical instrument, called the scarificator of which the following is a full and exact description, viz -

The scarificator, it is well known, consists of a number of lancets in the application of which, so as to make incisions of the precise extent required, very nice mechanism has been found necessary. The most approved scarificator heretofore used, had the lancets fixed in a box, on parallel axles (4 or 5 lancets on each) which axles were moved by a vertical lever, the end of which, in contact with the axles, was in the form of a segment of a circle, and toothed, so as to fit in with cogs on the axles, and the other end or handle extending through the bottom of the Box, so as to be grasped by the fingers. By pressing on the lever a half of a revolution was performed by the axles, and the lancets were set, i.e. fixed for application. The mode of application was by placing the box on the part where the incisions were to be made, the lancets being properly fixed, as before mentioned. Then, by pressing a spring a bolt which supported the lever was withdrawn, and the lancets returned to their first position, projecting through mortises cut in the cover of the box. The lancets were round at the end, their movement was circular, and the incisions made by cutting.

Figure 3:
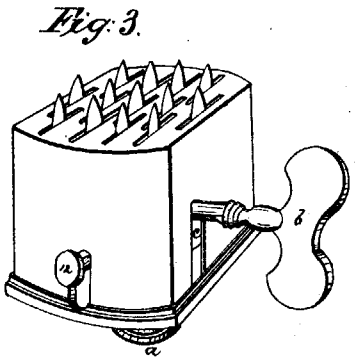
Figure 1:
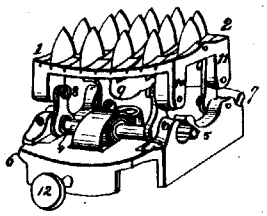
Figure 2:
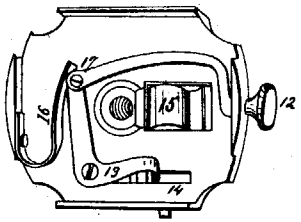

The principal improvements made by the above named George Tiemann, are the use of pointed lancets, a contrivance for moving them with more exactness, and in such manner as to cause less pain to the patient and more profuse bleeding; and the convenient form of the mechanism which admits its being reduced to a small compass and being easily cleaned and kept in order. The lancets are fastened firmly on a plate made to fit into a box of the kind commonly used but considerably smaller. For the purpose of raising and moving this plate, an axle and levers are used which will be readily understood by reference to fig. I. of the drawings accompanying this specification. It will be seen that 4 arms or levers are used two of which are fastened firmly on an axle and are connected with the lancet plate by pins on which they turn readily. The axle is inserted in a curb made in a second plate, parallel to the first, with raised pieces, in which are sockets to admit the ends of the axle. The other two levers are attached to similar raised parts and connected in the same way as the others with the lancet plate. The axle is turned by a key applied to one end, which projects through the box, as will be seen in fig. 3. of the drawings. it is prevented from performing more than a semi-revolution by a click which is seen in fig. 2 placed on the under side of the plate last mentioned, which catches in a notch made in a projecting rim of the axle. The click is made to slide out of the notch, by a lever attached to one end of it and extending through the box, the exterior part of which is seen in fig. 3. The operation of making incisions is performed by the lancets when returning to their first position, and this retrograde motion is effected by a well tempered steel spring like the main spring of a watch, which is wound round the axle before mentioned, one end being attached thereto, and the other fastened to the plate in which the axle rests; by which when the spring or lever which unfastens the click is touched, the axle is drawn back with considerable force.

The movement given to the lancets by this contrivance is somewhat in the direction of 2 sides of a parallelogram figure of which the base is the shorter side and twice the
length is the longer side. Its effect being first to make a
puncture which [illegible] is less painful than the operation by any
other instrument now used, and also more sure, as the pointed
lancets will make an incision with very little reaction —
against the box, whereas the other form of lancet meeting
with considerable resistance is apt to spring back and
throw the whole apparatus out of its place.

The lever power may be applied in other way
but the mode above described is probably the best.

Another part of the apparatus is for the purpose
of raising or depressing the lancets so as to make incisions of
the required depth which is done by means of a screw passing
thro' the bottom of the box and inserted in the lower plate before
mentioned. This is much more simple and convenient, —
than the apparatus used in other instruments for the same
object the operation of which is to raise and depress the lid of
the box.

Witnesses — George Tiemann
Alex. H. Dana
Edw. Radcliff (Drawing)

(Letters Patent dated 26 Aug. 1804)

1201 w93

Exd
[illegible]